(12) United States Patent
Walters

(10) Patent No.: US 6,638,158 B2
(45) Date of Patent: Oct. 28, 2003

(54) AUTOMOTIVE AIR DISTRIBUTION APPARATUS

(75) Inventor: Huw Walters, Llanelli (GB)

(73) Assignee: Calsonic Kansei UK Limited, Llanelli (GB)

( * ) Notice: Subject to any disclaimer, the term of this patent is extended or adjusted under 35 U.S.C. 154(b) by 0 days.

(21) Appl. No.: 10/031,425

(22) PCT Filed: May 16, 2001

(86) PCT No.: PCT/GB01/02175

§ 371 (c)(1),
(2), (4) Date: Apr. 22, 2002

(87) PCT Pub. No.: WO01/87654

PCT Pub. Date: Nov. 22, 2001

(65) Prior Publication Data

US 2002/0134527 A1 Sep. 26, 2002

(30) Foreign Application Priority Data

May 17, 2000 (GB) .............................................. 0011762

(51) Int. Cl.⁷ ................................................. B60H 1/26
(52) U.S. Cl. ....................................... 454/121; 137/595
(58) Field of Search ................................ 454/121, 156, 454/159, 160, 161; 137/595, 865

(56) References Cited

U.S. PATENT DOCUMENTS

| | | | | |
|---|---|---|---|---|
| 1,853,702 A | * | 4/1932 | Schmidt | 236/25 A |
| 2,837,115 A | * | 6/1958 | Bancroft | 137/596 |
| 5,217,045 A | * | 6/1993 | Gramm | 137/595 |
| 5,350,335 A | * | 9/1994 | Andersson | 454/121 |
| 6,016,976 A | | 1/2000 | Kern et al. | 239/503 |

FOREIGN PATENT DOCUMENTS

| | | |
|---|---|---|
| DE | 4401559 C1 | 5/1995 |
| DE | 19531248 A1 | 2/1997 |
| EP | 0149397 A2 | 7/1985 |
| EP | 0983884 A1 | 3/2000 |
| GB | 613022 | 11/1948 |
| GB | 899432 | 6/1962 |
| GB | 1160959 | 8/1969 |
| GB | 1296921 | 11/1972 |
| GB | 1309106 | 3/1973 |
| GB | 1441578 | 7/1976 |

* cited by examiner

Primary Examiner—Harold Joyce
(74) Attorney, Agent, or Firm—Gordon & Jacobson, P.C.

(57) ABSTRACT

An air distribution apparatus for a vehicular heating, ventilation, or air conditioning (HVAC) climate control system, includes a primary distribution arrangement reconfigurable to direct air to alternative outlet zones including two or more of a passenger footwell zone, passenger cabin vents and a vehicle windscreen. Ducting directs air flow to the alternative outlet zones. First and second rotary air distribution devices are adjustable rotationally between alternative configurations to distribute air into the ducting arrangement in alternative outlet configurations. Re-configuration of one of the devices is accompanied by complimentary re-configuration of the other device and/or air distribution devices are located immediately adjacent a cover panel or facia, the cover panel of facia including a user accessible control to control operation of the air distribution devices.

18 Claims, 2 Drawing Sheets

AUTOMOTIVE AIR DISTRIBUTION APPARATUS

FIELD OF THE INVENTION

The present invention relates to automotive air distribution apparatus and in particular to such apparatus for use in vehicle air conditioning/climate control systems or the like.

SUMMARY OF THE INVENTION

The invention is particularly directed to the primary means of directing air for HVAC/climate control systems to select between the main output zones (passenger footwell, passenger side vents, vehicle windscreen) or combinations thereof.

According to a first aspect, the present invention provides air distribution apparatus for a vehicular heating, ventilation, air conditioning (HVAC)/climate control system, the apparatus comprising a primary distribution arrangement re-configurable to direct air to alternative outlet zones including two or more of a passenger footwell zone, passenger cabin vents and a vehicle windscreen, the primary distribution arrangement including:

(a) ducting to direct air flow to the two or more alternative outlet zones.

(b) a first rotary air distribution device adjustable rotationally between alternative configurations to distribute air into the ducting arrangement in alternative outlet configurations;

(c) a second rotary air distribution device adjustable rotationally between alternative configurations to distribute air into the ducting arrangement in alternative outlet configurations; and (d) control means to adjust the configuration of the first and second air distribution devices, wherein:

i) re-configuration of one of the first and second devices is accompanied by complementary reconfiguration of the other device; and/or ii) the first and second air distribution devices are located immediately adjacent a cover panel or facia, the cover panel or facia including user accessible control means to control operation of the first and second air distribution devices.

The first and second air distribution devices are operationally linked, preferably such that re-configuration of one of the devices is accompanied by re-configuration of the other device, desirably to a corresponding degree of re-configuration.

The first and second devices are typically corresponding devices arranged to duct air to alternative space zones. Respective devices beneficially define respective distribution doors which are openable/closable upon re-configuration.

Such doors may be defined between a housing and the respective devices. Typically the respective devices have shielding portions (or positions) cutting off air supply to a predetermined outlet (or outlet configuration). Corresponding open or aperture portions (or positions) permit air supply to the relevant outlet configurations.

Beneficially, one or both of the distribution devices is re-configurable rotationally.

The first and second distribution devices may be mechanically linked. The distribution devices are preferably linked by interlocking drive means.

The distribution devices are preferably rotationally re-configurable and there exists a tangential contact zone permitting one device, when rotated, to rotationally drive the other device.

In one embodiment the respective distribution devices may be provided with respective sets of circumferential teeth arranged to inter-mesh and facilitate one distribution device driving another.

The distribution devices are preferably coupled and desirably rotationally re-configurable and arranged such that rotation of one device in a clockwise sense is complemented by rotation of the coupled device in an anti-clockwise sense.

Beneficially, the arrangement further comprises:

(a) a control actuator for manual actuation to adjust the configuration of an air distribution device; and, (b) a control linkage between the air distribution device and the control actuator;

wherein the actuator, control linkage and air distribution device are substantially in line, the length of the control linkage between the actuator and air distribution device corresponding substantially to the in-line spacing between the actuator and air distribution device.

The actuator and air distribution device are preferably rotationally operable and arranged along a substantially common rotational axis. The control actuator and the air distribution device are preferably arranged immediately adjacent one another.

According to a further aspect, the invention therefore provides air distribution apparatus particularly for vehicular use, the apparatus comprising:

(a) an air distribution device adjustable between alternative configurations to distribute air in alternative outlet configurations;

(b) a control actuator for manual actuation to adjust the configuration of the air distribution device;

(c) a control linkage between the air distribution device and the control actuator;

wherein the actuator, control linkage and air distribution device are substantially in line, the length of the control linkage between the actuator and air distribution device corresponding substantially to the in-line spacing between the actuator and air distribution device.

Desirably, the air distribution device is provided immediately rearward of an air conditioning unit (a heater, dehumidifier, air cooler, air flow unit, or an air conditioning unit capable of performing a plurality of such air conditioning functions). The air conditioning unit is preferably arranged in-line with the control actuator, and air distribution device.

Respective distribution devices preferably comprise a dish or bowl shaped shell-arranged such that air is delivered into the interior of the bowl or dish shaped shell and distributed radially through one or more air outlets provided in the bowl or dish shaped shell. The radial direction of the air delivery depends upon the orientation/configuration of the dish shaped shells.

Desirably, the distribution device is provided in a housing, which housing defines outlets or ducts for distribution of air. In a preferred embodiment, two devices are provided adjacent one another, each controlling air distribution to a respective side of the vehicle.

The invention will now be further described in a specific embodiment, by way of example only, and with reference to the accompanying drawings.

DETAILED DESCRIPTION OF THE PREFERRED EMBODIMENTS

Figure 1:
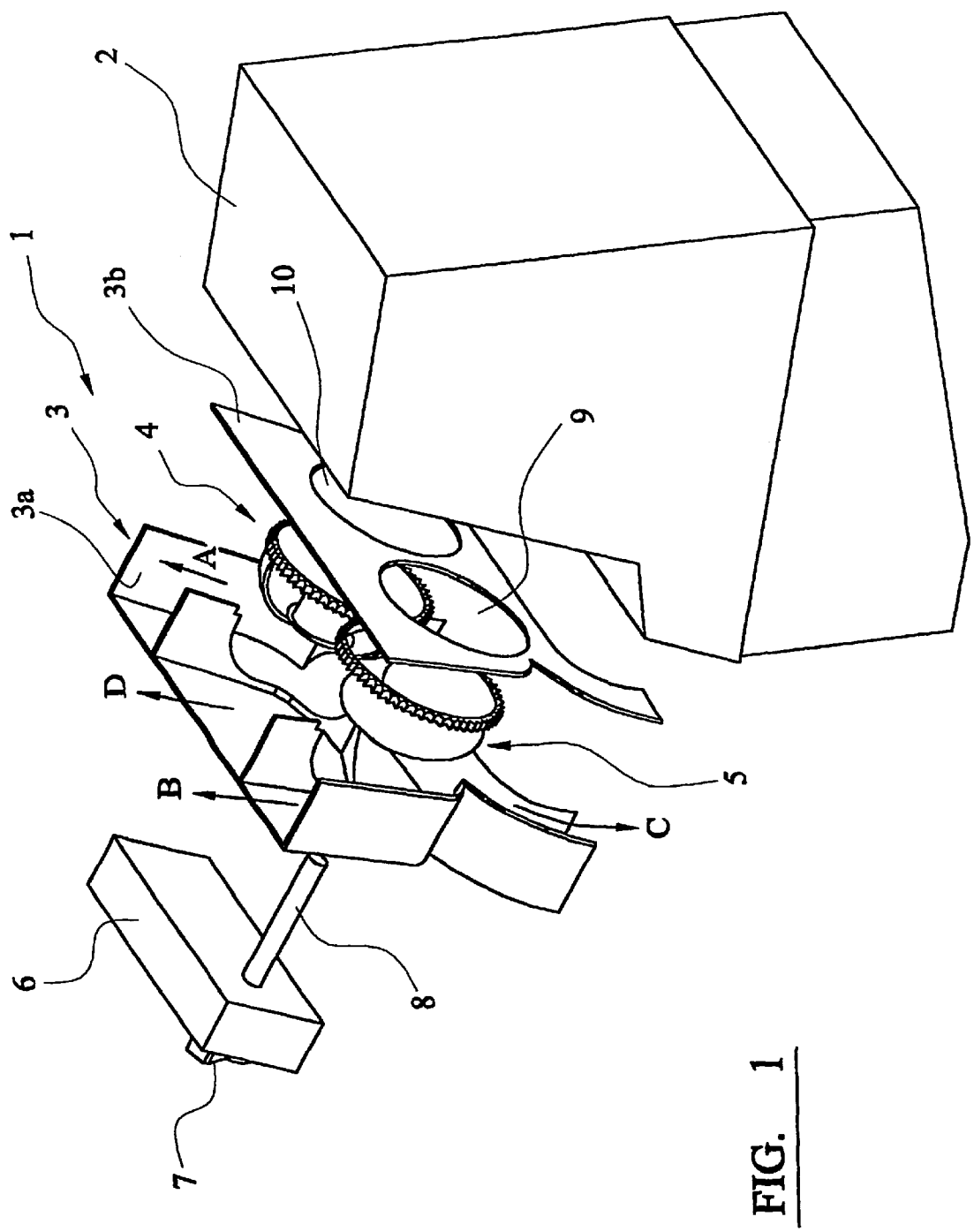
FIG. 1 is a schematic perspective exploded view of a distribution apparatus according to the invention.

Referring to the drawings there is shown a distribution arrangement 1 for air to be delivered to the passenger compartment of a vehicle. The arrangement includes an air conditioning unit 2 including a shell housing 3 for re-configurable rotary air distribution devices 4, 5. The rear portion 3a of the housing 3 may form part of the internal vehicle control fascia (or be provided adjacent such a facia). A mounting 6 is provided for a manually actuatable actuator 7 for controlling operation of the rotary devices 4, 5. An axially rotatable linkage rod 8 extends from actuator 7 to connect with rotary device 5 at the rotational axis hub 12 of rotary device 5. Remotely controlled geared electrical motors could alternatively be used to control actuation of the rotary devices 4, 5.

Figure 2:
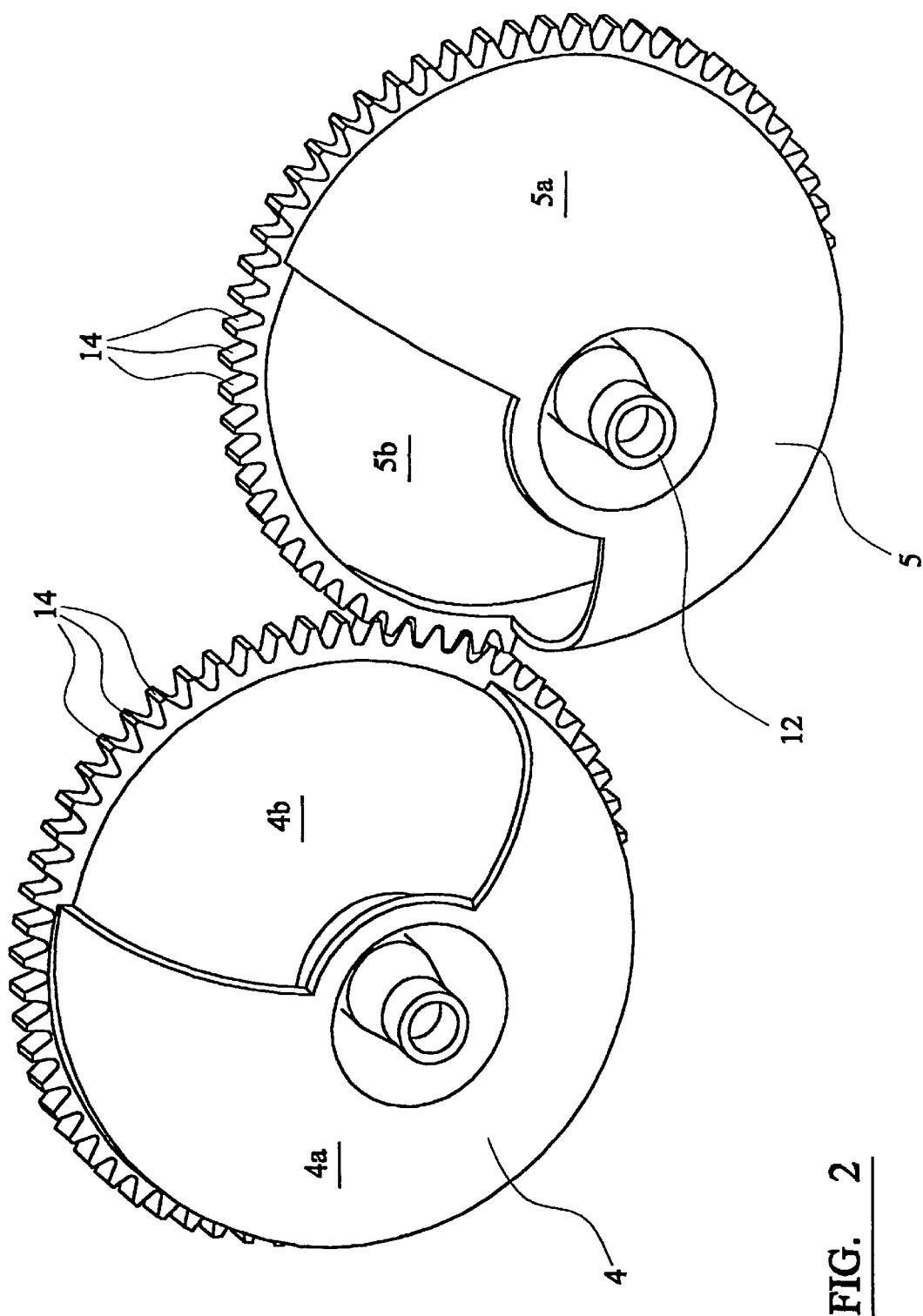
FIG. 2 is a schematic perspective view of components of the apparatus of FIG. 1.

In use, conditioned air (heated, dehumidified, cooled, etc.) is supplied from air conditioning unit 2 via respective apertures 9, 10 (in the front plate 3b of housing 3) into a space defined in the interior of the respective rotary distribution devices 4, 5. Rotary distribution devices 4, 5, as shown most clearly in FIG. 2, are bowl shaped in configuration, thereby defining an internal space. The annular rim of each respective rotary air distribution device 4, 5 is provided with a series of teeth at uniform pitch, such that when one distribution device 4/5 rotates, the meshing teeth cause the other rotary distribution device 4, 5 to be correspondingly rotated (in an alternative sense). If, for example, device 5 is rotated in an clockwise sense, then the device 4 will be rotated to a corresponding degree in an anti-clockwise sense.

Each rotary distribution device 4, 5 is provided with a wall portion 4a, 5a and an aperture (or cut-out portion 4b, 5b).

The rear housing portion 3a defines (in combination with the front portion 3b) a number of duct routes out of the housing (see arrows A, B, C, D in FIG. 1) giving potential ducting routes to which air may be directed, depending upon the rotational orientation of the devices 4, 5. For example, if the cut-out portions 4b, 5b are aligned with the ducts defined for arrows A, B, then air entering the distribution arrangement via apertures 9, 10 will be ducted radially and upwardly to follow the course of arrows A, B and directed to passenger side vents; if however the cut-out portions 4b, 5b are aligned with the duct routes for arrow C (and the corresponding duct provided for rotary device 4) then the air will be ducted radially downwardly to the passenger footwell. Duct D directs air to the vehicle windscreen. Different cut-out shapes and configurations can give alternative potential combinations of ducting configurations. Partial overlap of cut-out portions 4b, 5b with respective outlet ducts also give different performance characteristics.

The end of actuation rod 8 is connected fixedly to the axial rotational hub 12 of rotary distribution device 5. When actuator 7 is rotated axially, distribution device 5 is caused to rotate in response, as is distribution device 4 by virtue of the meshed teeth coupling of the devices 4, 5.

Due to the relative positional orientations of the distribution devices 5, 4, housing 3 and the actuator 7, the control rod 8 can be of a relatively short length. The direct connection to drive rotary device 5 (and consequently rotary device 4 also). This direct and short-length connection has benefits as will be explained below.

The angular movement of the actuator 7, rod 8 and the driven distribution devices 4, 5 correspond directly to one another. If rotation angle ratios between the actuator 7 and distribution devices 4, 5 need to be varied from 1:1, then intermediate gearing can be included to achieve this. Gearing can also be used to compensate for mis-alignment of meshed coupling of the devices 4, 5. The nature of the connection between actuator 7 and distribution devices 4, 5 by virtue of the in-line and short length connector 8, is extremely positive and reduces hysteresis and backlash and provides a linkage having substantially constant operational torque to more control actuator 7 throughout the full range of turning. These advantages exists whether or not a single control rod 8 is used to drive both doors, or whether the interlocking meshed teeth feature is not included in a particular embodiment, and the doors are driven separately by separate respective control rods actuated by independent actuators.

Whilst the distribution devices 4, 5 have been described primarily in relation to "bowl" shaped devices, it should be understood that the invention is intended to cover other configurations, such as apertured disc shaped distribution devices. Furthermore, where the drive means is described primarily in relation to a rotational actuator, it is envisaged that the invention is applicable to other types of actuator, such as for example, slider type actuators.

The invention provides a distribution apparatus enabling high level of commonality of system components, and a minimum number of system components to be used. For example, identical devices 4, 5 may be used and minimum number of drive components (single drive rod 8). Hysteresis and tolerance problems which occur with prior art more complex distribution apparatus are reduced. Control "load-spikes" which are common with other arrangements where more complex linkages between actuator and distribution devices are provided, are substantially ameliorated by making operational loads substantially even throughout travel of doors and control actuator. The arrangement shown also permits distribution devices to be located directly rearward of the air conditioning unit leaving more space for distribution ducts or other components within the air conditioning unit itself.

What is claimed is:

1. Air distribution apparatus for a vehicular heating, ventilation, or air conditioning (HVAC)/climate control system, the apparatus comprising a primary distribution arrangement re-configurable to direct air to alternative outlet zones including two or more of a passenger footwell zone, passenger cabin vents and a vehicle windscreen, the primary distribution arrangement including:

(a) ducting to direct air flow to the two or more alternative outlet zones;
    (b) a first rotary air distribution device adjustable rotationally between alternative configurations and acting on air to distribute air into the ducting arrangement in alternative outlet configurations;
    (c) a second rotary air distribution device adjustable rotationally between alternative configurations and acting on air to distribute air into the ducting arrangement in alternative outlet configurations; and
    (d) control means to adjust the configuration of the first and second air distribution devices, wherein re-configuration of one of the first and second devices is accompanied by complementary re-configuration of the other device.

2. Air distribution apparatus according to claim 1, wherein the first and second air distribution devices are operationally linked.

3. Air distribution apparatus according to claim 1, wherein re-configuration of one of the devices is accompanied by complementary re-configuration of the other device to corresponding degree of reconfiguration.

4. Air distribution apparatus according to claim 1, comprising a HVAC or climate control unit including a housing for the first and second rotary distribution devices and having unit air outlets from the ducting arrangement.

5. Air distribution apparatus according to claim 1, wherein respective devices define respective distribution doors which are openable/closable upon re-configuration of the devices.

6. Air distribution apparatus according to claim 1, wherein the output ducting distribution direction is substantially radial with respect to the rotational axis of the distribution devices.

7. Air distribution apparatus according to claim 1, wherein the first and second distribution devices are mechanically linked.

8. Air distribution apparatus according to claim 7, wherein the first and second distribution devices are linked by interlocking drive means.

9. Air distribution apparatus according to claim 1, wherein the first and second distribution devices are rotationally re-configurable and there exists a tangential contact zone permitting one device, when rotated, to rotationally drive the other device.

10. Air distribution apparatus according to claim 1, wherein the first and second distribution devices are rotationally re-configurable and arranged such that rotation of one device in a clockwise sense is complemented by rotation of the coupled device in an anti clockwise sense.

11. Air distribution apparatus according to claim 1, wherein the distribution devices are capable of being rotationally re-oriented about respective axes, which axes are substantially parallel to one another.

12. Air distribution apparatus according to claim 11, wherein the distribution devices have respective rims and the distribution devices are rim coupled to be capable of being re-oriented to deliver air in different outlet configurations.

13. Air distribution apparatus according to claim 1, wherein the air distribution devices include open portions and closed portions, the open portions and closed portions matching up with the ducting arrangement in alternative rotational configurations to provide alternative operational air outlet ducting arrangements.

14. Air distribution apparatus according to claim 1, wherein the distribution devices comprise concave shell elements receiving air supplied and distributing air radially.

15. Air distribution apparatus according to claim 1, further comprising:

(a) a control actuator for manipulation or touch to adjust the configuration of an air distribution device; and, (b) a control linkage between the air distribution device and the control actuator,
wherein the actuator, control linkage and air distribution device are substantially in line, the length of the control linkage between the actuator and air distribution device corresponding substantially to the in-line spacing between the actuator and air distribution device.

16. Air distribution apparatus according to claim 13, wherein the actuator-and air distribution device are rotationally operable and arranged along a substantially common rotational axis.

17. Air distribution apparatus according to claim 15, wherein the control actuator and the air distribution device are arranged immediately adjacent one another.

18. Air distribution apparatus according to claim 1, wherein the first and second air distribution devices are located immediately adjacent a cover panel or facia, the cover panel or facia including user accessible control means to control operation of the first and second air distribution devices.

* * * * *